US006665283B2

United States Patent

Harris et al.

(10) Patent No.: US 6,665,283 B2
(45) Date of Patent: Dec. 16, 2003

(54) METHOD AND APPARATUS FOR TRANSMITTING DATA IN A PACKET DATA COMMUNICATION SYSTEM

(75) Inventors: John M. Harris, Chicago, IL (US); Paul M. Erickson, Palatine, IL (US)

(73) Assignee: Motorola, Inc., Schaumburg, IL (US)

(*) Notice: Subject to any disclaimer, the term of this patent is extended or adjusted under 35 U.S.C. 154(b) by 131 days.

(21) Appl. No.: 09/971,430

(22) Filed: Oct. 5, 2001

(65) Prior Publication Data

US 2003/0032439 A1 Feb. 13, 2003

Related U.S. Application Data

(60) Provisional application No. 60/311,702, filed on Aug. 10, 2001.

(51) Int. Cl.[7] .................. H04Q 7/00; H04B 17/00
(52) U.S. Cl. .............. 370/333; 455/67.11; 455/522; 370/318; 370/463
(58) Field of Search .................... 455/522, 69, 70, 455/67.11, 67.16; 370/311, 318, 335, 516, 337, 468, 517, 342, 333

(56) References Cited

U.S. PATENT DOCUMENTS

| | | | | |
|---|---|---|---|---|
| 4,580,262 A | * | 4/1986 | Naylor et al. ............... 714/708 |
| 4,777,653 A | * | 10/1988 | Bonnerot et al. ............ 455/69 |
| 5,210,751 A | * | 5/1993 | Onoe et al. ................. 370/349 |
| 5,713,074 A | * | 1/1998 | Hulbert ....................... 455/69 |
| 5,722,051 A | * | 2/1998 | Agrawal et al. ............. 455/69 |
| 5,793,744 A | * | 8/1998 | Kanerva et al. ............. 370/209 |
| 5,887,245 A | * | 3/1999 | Lindroth et al. ............ 455/69 |
| 6,085,106 A | | 7/2000 | Sendonaris et al. |
| 6,434,130 B1 | * | 8/2002 | Soininen et al. ............ 370/331 |
| 6,452,950 B1 | * | 9/2002 | Ohlsson et al. ............. 370/516 |

OTHER PUBLICATIONS

Zhuang, W. "Integrated Error Control and Power Control for DS–CDMA Multimedia Wireless Communications." *IEE Proceedings: Communications, Institution of Electrical Engineers;* GB vol. 146, No. 6, Dec. 1999, pp 359–365.

* cited by examiner

Primary Examiner—Charles Appiah
(74) Attorney, Agent, or Firm—Steven A. May

(57) ABSTRACT

A wireless communication system transmits data over a first link from a first mobile station (MS) to an infrastructure at a first speaker link power level, and over a second link from the infrastructure to a second MS at a first listener link power level, during a first time period. Each of the first power levels is designed to avoid the need for retransmissions of erroneously received data. Upon expiration of the first time period, data is transmitted over the first and second links at reduced power levels, which transmissions include retransmissions of erroneously received data. Error targets used in the transmission of data may also be adjusted after expiration of the first time period. In addition, the power levels and error rate targets may be individually adjusted on a link-by-link basis based on the RF loading of each link and/or based on error metrics determined for each link.

17 Claims, 9 Drawing Sheets

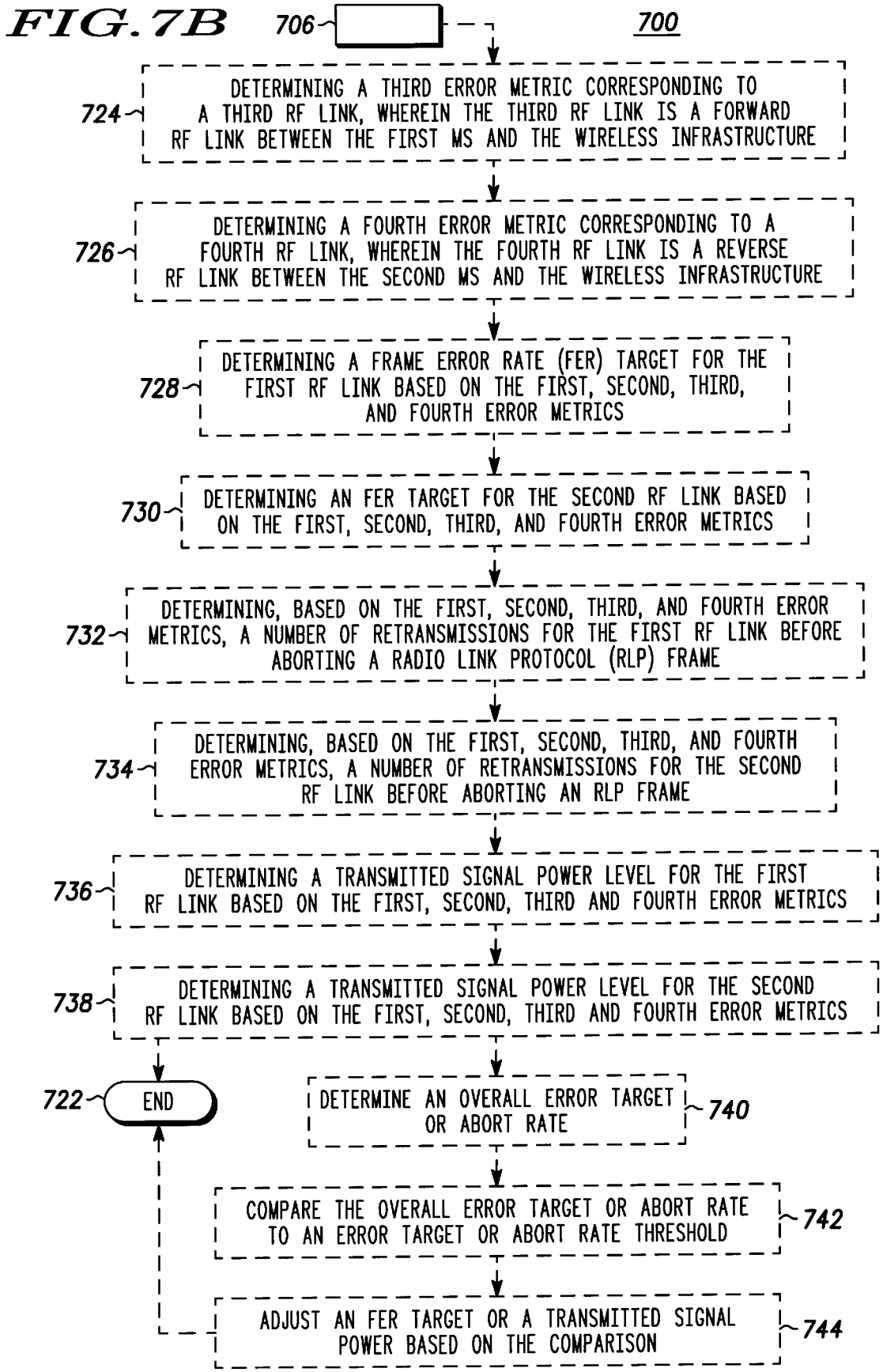

METHOD AND APPARATUS FOR TRANSMITTING DATA IN A PACKET DATA COMMUNICATION SYSTEM

REFERENCE(S) TO RELATED APPLICATION(S)

The present application claims priority from provisional application, Ser. No. 60/311,702. entitled "METHOD AND APPARATUS FOR TRANSMITTING DATA IN A PACKET DATA COMMUNICATION SYSTEM," filed Aug. 10, 2001, which is commonly owned and incorporated herein by reference in its entirety.

FIELD OF THE INVENTION

The present invention relates generally to wireless packet data communication systems, and, in particular, to the transmission of data in a wireless packet data communication system.

BACKGROUND OF THE INVENTION

Wireless packet data communication systems are well known and consist of many types, including land mobile radio, cellular radiotelephone, and personal communication systems. With each communication system, data is transmitted between a transmitting communication device and a receiving communication device via a communication resource that includes a communication channel that operates over a physical resource, typically a frequency bandwidth.

In a typical packet data communication system, information is transmitted in data packets, or data frames. In a transmitting communication device, a lengthy data stream is typically subdivided into multiple data blocks. Each data block is then wrapped with a header to form a data packet. Included in the header for each data packet is a sequence number corresponding to the position of the data block in the data stream. The sequence numbers allow a receiving communication device to receive the multiple data packets comprising the multiple data blocks in any order and to reassemble the original data stream.

The receiving communication device stores the received data blocks in a resequencing, or jitter, buffer, where the data blocks are reordered in their proper sequence and stored. The jitter buffer stores a predetermined amount of data and, when full, conveys the stored data to a user of the receiving communication device, that is, a listener, via a user interface.

In a typical Radio Link Protocol (RLP) wireless communication system, erroneously received data packets are acknowledged by transmission of a NAK message by the receiving communication device. The NAK message includes an identifier of the erroneously received data packet. The transmitted data packets are stored in a memory of the transmitting communication device. When the transmitting communication device receives the NAK message, the transmitting communication device retransmits the identified data packet.

By storing data in a jitter buffer, gaps in voice may be avoided, which gaps result from the retransmission of erroneously received data. For example, the data stream conveyed from the transmitting communication device to the receiving communication device may be an audio message "Do not place the order." If the data packets corresponding to the word "not" are erroneously received, the data in those packets would not be conveyed to the listener in the absence of a retransmission. The received message might then be conveyed as "Do place the order," with a gap appearing in place of the word "not." Therefore, jitter buffers are used to store all data received after the erroneously received data packet, pending retransmission of the erroneous packet. When the retransmitted packet is received, the packet is inserted into its proper position among the stored data and the data is played out to the listener. The jitter buffer typically is of sufficient size that the jitter buffer can store all data received subsequent to the erroneously received data until the erroneously received data is acknowledged, retransmitted, and properly inserted into the data stored in the buffer.

Although the use of the jitter buffer improves the reliability of a data communication by providing for the retransmission of erroneously received data, the use of the jitter buffer also produces a delay in the set up of a dispatch communication. In order to prevent a gap from appearing at some point in a voice communication due to the acknowledgment and retransmission of erroneously received packets, the receiving communication device does not initially convey a voice communication to the listener until the jitter buffer is full. By imposing a system delay at the start of the conversation, erroneously received data may be retransmitted and inserted in already received data without creating a subsequent voice gap when a later erroneous packet is received and subsequently received data must be stored.

For a communication system that employs a single acknowledgment and retransmission, the jitter buffer-related delay may be 200 ms or more. This delay is in addition to other call set up delays between the moment that a user of the transmitting communication device, that is, a speaker, initiates a call, such as by pressing a push-to-talk (PTT) button on a keypad of the device, to the moment that an audio message input by the speaker into the transmitting communication device is conveyed to the listener at the receiving communication device. Similarly, a jitter buffer delay resulting from a filling of a jitter buffer in a receiving communication device occurs each time there is a change in who is speaking in the dispatch communication.

Any delay in call set up is undesirable, as is any delay in the time that it takes an audio message spoken into a transmitting communication device to be conveyed to a listener at a receiving communication device. One alternative to imposing a jitter buffer delay upon a dispatch call set up is to increase a power level used to transmit data packets. It is well known that there is an inverse relationship between a data packet or frame error rate (FER) and power level at which the data packet is transmitted. Transmitting data packets at higher power levels diminishes the probability that intervening factors in the propagation environment will interfere with the transmission and corrupt the transmitted data packet. If the power level is great enough, the FER may be reduced to a level where retransmission of erroneously received data is no longer necessary in order to achieve an acceptable FER. However, by transmitting data packets at an increased power level, the possibility that the transmission will interfere with other communications using the same or adjacent frequency bandwidths is increased.

Therefore a need exists for a method and an apparatus for reducing jitter buffer delay while minimizing the interference created for other communications using the same or adjacent frequency bandwidths.

BRIEF DESCRIPTION OF THE DRAWINGS

FIG. 7B is a continuation of the logic flow diagram of FIG. 7A of the steps executed by a communication system in transmitting data packets in accordance with another embodiment of the present invention.

DETAILED DESCRIPTION OF THE INVENTION

Figure 1:
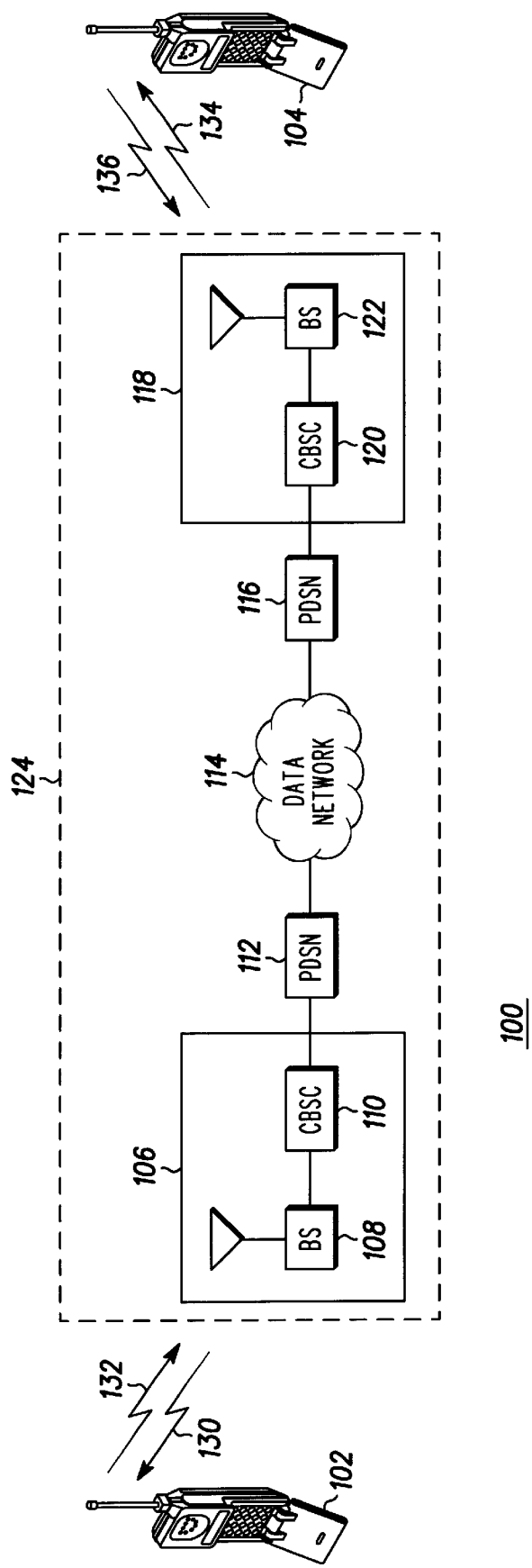
FIG. 1 is a block diagram of a wireless packet data communication system in accordance with an embodiment of the present invention.

To address the need for a method and an apparatus for reducing jitter buffer delay while minimizing the interference created for other communications using the same or adjacent frequency bandwidths, a wireless communication system is provided that transmits data over a first link from a first mobile station (MS) to an infrastructure at a first speaker link power level, and over a second link from the infrastructure to a second MS at a first listener link power level, during a first time period. Each of the first power levels is designed to avoid the need for retransmissions of erroneously received data. Upon expiration of the first time period, data is transmitted over the first and second links at reduced power levels, which transmissions include retransmissions of erroneously received data. Error targets used in the transmission of data may also be adjusted after expiration of the first time period. In addition, the power levels and error rate targets may be individually adjusted on a link-by-link basis based on the RF loading of each link and/or based on error metrics determined for each link.

Generally, an embodiment of the present invention encompasses a method for transmitting data including a step of transmitting, by a first communication device, a first set of data at a first power level during a first time period, wherein the first power level is such that the first set of data is received by a second communication device at an acceptable error rate without utilizing a retransmission of a portion of the first set of data. The method further includes steps of transmitting, by the first communication device, a second set of data at a second power level upon expiration of the first time period, wherein the second power level is less than the first power level, and when a portion of the second set of data is erroneously received by the second communication device, retransmitting the erroneously received portion.

Another embodiment of the present invention encompasses a method for transmitting data in a wireless communication system, wherein the communication system includes a first wireless communication device, a wireless infrastructure in communication with the first communication device via a reverse link, and a second wireless communication device in communication with the infrastructure via a forward link. The method includes steps of determining a first radio frequency (RF) load metric corresponding to an RF load of the reverse link and determining a second RF load metric corresponding to an RF load of the forward link. The method further includes steps of determining an acceptable error rate for the forward link based on the first and second RF load metrics and determining an acceptable error rate for the reverse link based on the first and second RF load metrics.

Still another embodiment of the present invention encompasses a method for transmitting data in a wireless communication system that includes a first wireless communication device, a wireless infrastructure in communication with the first communication device via a first reverse link and a first forward link, and a second wireless communication device in communication with the infrastructure via a second reverse link and a second forward link. The method includes steps of determining a first error metric corresponding the first reverse link, determining a second error metric corresponding the first forward link, and determining an acceptable frame error rate of one or more of the first reverse link, and the second forward link based on the first error metric and the second error metric.

The present invention may be more fully described with reference to FIGS. 1–7B. FIG. 1 is a block diagram of a wireless packet data communication system 100 in accordance with an embodiment of the present invention. Communication system 100 includes multiple mobile stations (MS's) 102, 104, (two shown) such as cellular telephones or radiotelephones. Each MS 102, 104 is serviced by a respective base site 108, 122 in a respective radio access network (RAN) 106, 118. Each base site includes at least one base transceiver station (BTS) (not shown).

Each base site 108, 122 provides wireless communications services to the mobile units in the base site's coverage area. That is, base site 108 provides communications services to MS 102 and base site 122 provides communications services to MS 104. Each RAN 106, 118 further includes a respective centralized base station controller (CBSC) 110, 120 in communication with the respective base site 108, 122. Each RAN 106, 118 is in communication with a respective packet data service node (PDSN) 112, 116, which PDSN's are in turn in communication with a data network 114, such as the Internet. Together, RAN's 106 and 118, PDSN's 112 and 116, and data network 114 are collectively referred to herein as a fixed infrastructure 124.

Each RAN 106, 118 provides wireless voice and data communication services to the mobile stations in the RAN's coverage area and may do so in accordance with virtually any wireless communication protocol. Preferably, communication system 100 is a Code Division Multiple Access (CDMA) communication system that operates in accordance with the TIA/EIA (Telecommunications Industry Association/Electronic Industries Association) IS-2000 standard, hereby incorporated herein, which provides a compatibility standard for IS-2000 communication systems, and RAN's 106 and 118 are each an IS-2000 access network. However, those who are of ordinary skill in the art realize that communication system 100 may utilize any one of multiple communication protocols, such as Time Division Multiple Access (TDMA), Global System for Mobile communications (GSM), or Orthogonal Frequency Division Multiplexing (OFDM).

Base site 108, wirelessly communicates with MS 102 via a forward link 130 and a reverse link 132. Similarly, base site 122 wirelessly communicates with MS 104 via a forward link 134 and a reverse link 136. Each of forward links 130, 134 and reverse links 132, 136 includes multiple communication channels. Typically, the multiple communication channels of each link include a pilot channel, multiple paging channels, and multiple traffic channels. Preferably, communication system 100 preferably is a Code Division Multiple Access (CDMA) communication system in which a communication channel comprises an orthogonal code that is used to cover transmitted data; however, in alternative embodiments system 100 may be a Time Division Multiple Access (TDMA) or Global System for Mobile communication (GSM) communication system in which a communication channel comprises a time slot or a Frequency Division Multiple Access (FDMA) or Orthogonal Frequency Division Multiple Access (OFDM) communication system in which a communication channel comprises a frequency bandwidth.

Figure 2:
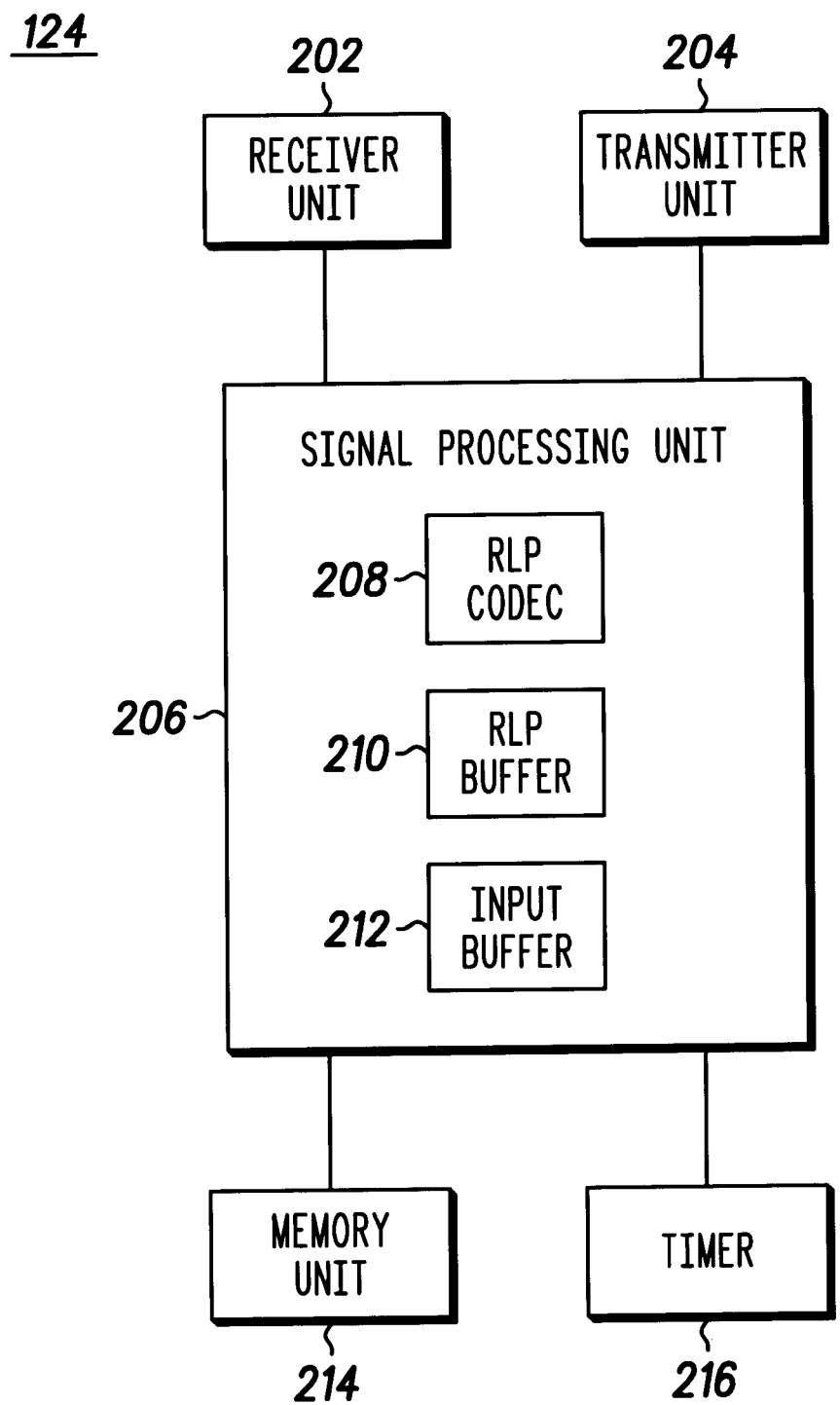
FIG. 2 is a functional block diagram of an infrastructure of FIG. 1 in accordance with an embodiment of the present invention.

FIG. 2 is a functional block diagram of fixed infrastructure 124 in accordance with an embodiment of the present invention. Infrastructure 124 includes a receiver unit 202 and a transmitter unit 204 that are each in communication with a signal processing unit 206. The functions of signal processing unit 206 may be performed by one or more microprocessors or a digital signal processors (DSP's). Signal processing unit 206 includes a radio link protocol (RLP) coder/decoder (codec) 208 that decodes data received via receiver unit 202 and that encodes data for transmission via transmitter 204. Signal processing unit 206 further includes an RLP buffer 210, preferably a resequencing, or jitter, buffer and an input buffer 212; however, in another embodiment of the present invention each of RLP buffer 210 and input buffer 212 may be included in a memory unit 214 associated with signal processing unit 206.

Figure 3:
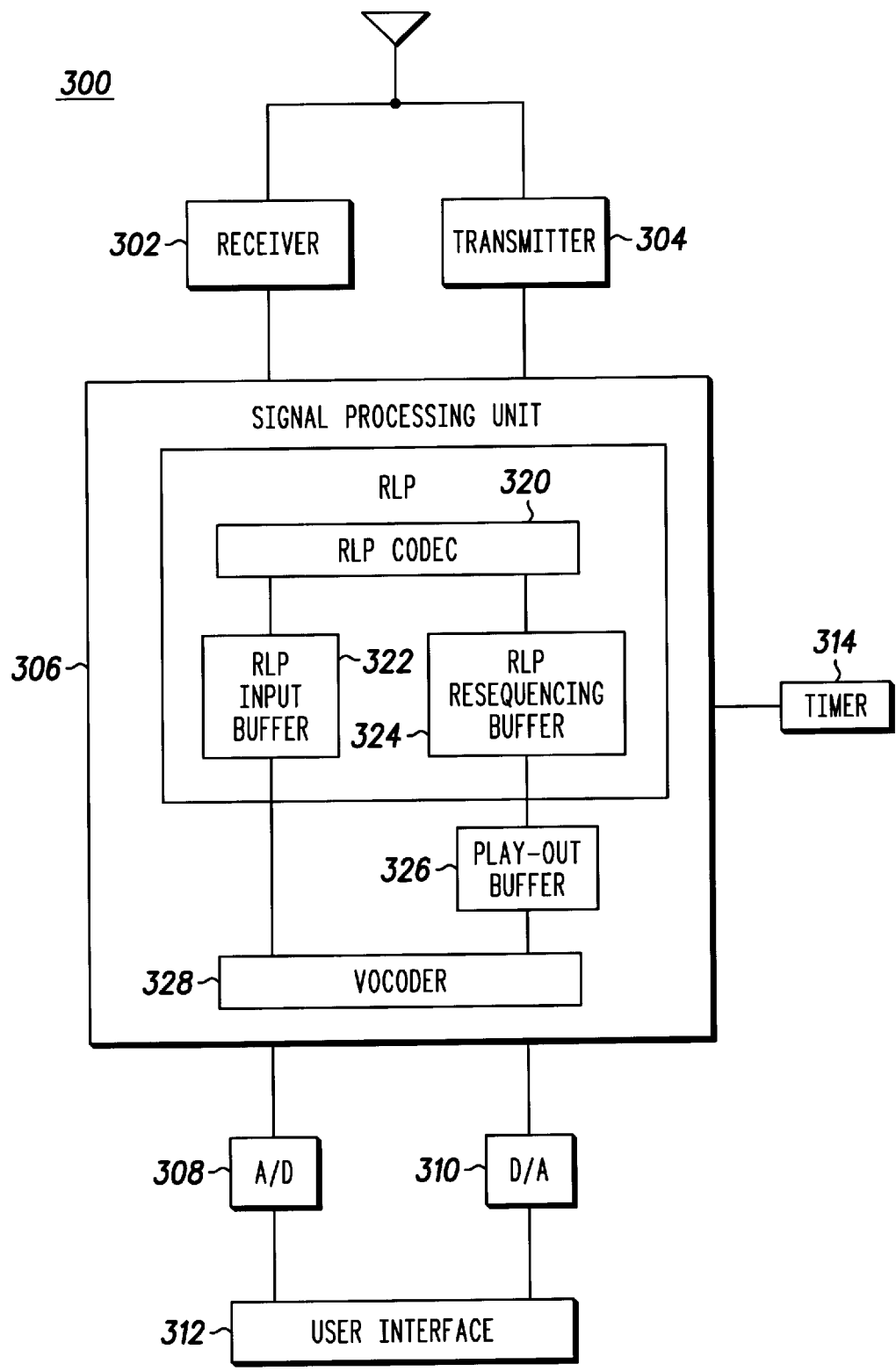
FIG. 3 is a block diagram of a mobile communication device of FIG. 1 in accordance with an embodiment of the present invention.

FIG. 3 is a block diagram of a mobile station 300, such as MS 102 and MS 104, in accordance with an embodiment of the present invention. Mobile station 300 includes a receiver 302 and a transmitter 304 that are each in communication with a signal processing unit 306, such as a microprocessor or a digital signal processor (DSP). Signal processing unit 306 executes multiple applications, such as vocoder 328, and programs that are stored in the signal processing unit or in an associated memory and that permit the functioning of mobile station 300. Signal processing unit 306, or alternatively the memory associated with the signal processing unit, further includes an RLP input buffer 322 that stores RLP frames for subsequent transmission via transmitter 304, an RLP resequencing, or jitter, buffer 324 that stores RLP frames received via receiver 302, and a play-out buffer 326 that stores vocoder frames derived from the RLP frames stored in RLP jitter buffer 324. Mobile station 300 further includes an analog-to-digital converter (A/D) 308 and a digital-to-analog converter (D/A) 310 in communication with signal processing unit 306 and a user interface 312 in communication with each of A/D 308 and D/A 310. User interface 312 provides an interface with a user of mobile station 300 whereby the user may input information into the mobile station or receive information output by the mobile station.

When a user of a mobile station, such as MS 102, wishes to initiate a dispatch communication with a target mobile station, such as MS 104, the user depresses a push-to-talk (PTT) key included in user interface 312. Depression of the PTT key causes MS 102 to transmit a dispatch request over a channel in reverse link 132, preferably an access channel (ACH). The dispatch request includes an identifier uniquely associated with MS 102.

Upon receiving the dispatch request, infrastructure 124, preferably RAN 106, assigns MS 102 use of a traffic channel in each of reverse link 132 and forward link 130. Traffic channels, or speaker radio frequency (RF) links, are then set up in each of reverse link 132 (i.e., a speaker reverse RF link) and forward link 130 (i.e., a speaker forward RF link) between MS 102 and infrastructure 124 by well known channel assignment and call set up techniques. After the speaker RF links are built and infrastructure 124 receives a response to a paging message from MS 104 verifying an availability of MS 104, RAN 106 conveys a message to MS 102 on the speaker reverse RF link indicating that the MS can play a talk permit tone (TPT), such as a beep, informing the user of MS 102 that he or she may begin speaking into MS 102. Preferably, this message is sent via CDMA signaling. MS 102 then plays the TPT.

In addition, upon receiving the dispatch request from MS 102, infrastructure 124, via RAN 118, sends a paging message to MS 104 over a paging channel in forward link 134. In response to receiving the paging message, MS 104 and RAN 118 engage in an exchange of CDMA signaling messages in order to set up traffic channels, or listener RF links, in each of forward link 134 (a listener forward RF link) and reverse link 136 (a listener reverse RF link). The listener RF links provide an over-the-air link by which RAN 118 may transmit RLP frames to MS 104. By building the speaker reverse RF link in reverse link 132 and the listener forward RF link in forward link 134, an overall forward link is established between MS 102 and MS 104 that comprises two RF legs or links, that is, the speaker reverse RF link and the listener forward RF link.

The process of setting up the speaker RF links typically begins prior to the transmission of the paging messages to MS 104. As a result, set up of the speaker RF links is typically completed prior to the completion of the set up of the listener RF links. In the prior art, the user of MS 102, that is, the speaker, is not permitted to begin speaking until the listener RF links are completed. The amount of time elapsing between completion of the speaker RF links and completion of the listener RF links can be 400 ms or more. In the prior art, it can take 500 ms or longer to fill RLP jitter buffer 326 in MS 104 before the MS begins playing out voice.

When the TPT is played, the user of MS 102 may begin speaking. In one embodiment of the present invention, MS 102 does not produce any vocoded frames or transmit any RLP frames until the MS detects significant voice activity, saving RF bandwidth. In another embodiment of the present invention, MS 102 begins producing vocoded frames upon expiration of the TPT. In the latter embodiment, MS 102, and in particular vocoder 328, generates and transmits silent vocoded frames until the speaker begins speaking.

When the user of MS 102 begins speaking into the MS, the audio information is digitized by A/D 308 to produce digital data. MS 102 routes the digital data to signal processing unit 306 of MS 102, which routes the digital data to vocoder 328. Vocoder 328 compresses the digital data pursuant to any one of numerous well known voice compression algorithms to produce multiple vocoded frames. Preferably each vocoded frame is either 99 bits in length, with a vocoded frame generated every 45 ms, or is 128 bits in length, with a vocoded frame generated every 30 ms. Each vocoded frame is then sent to RLP input buffer 322, where the frame may be combined with other vocoded frames output by vocoder 328 and is wrapped with an RLP header to produce an RLP frame. MS 102 then transmits the RLP frame to RAN 106 via codec 320, transmitter 304 and the speaker reverse RF link.

Figure 4:
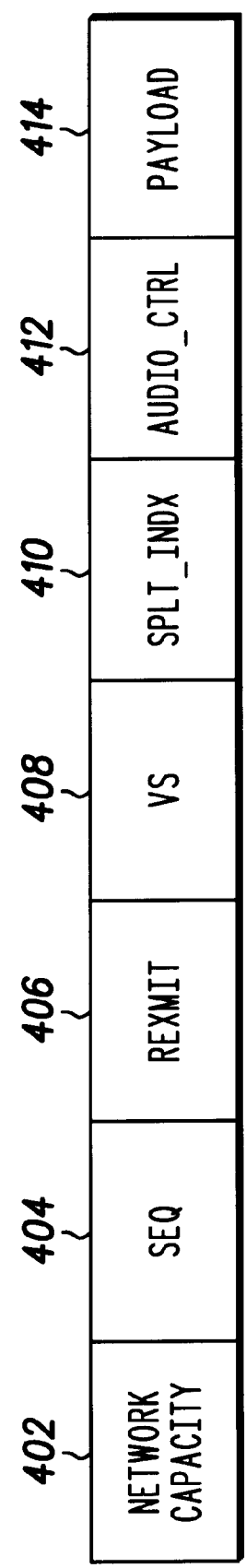
FIG. 4 is a block diagram of an RLP frame in accordance with an embodiment of the present invention.

FIG. 4 is a block diagram of an RLP frame 400 in accordance with an embodiment of the present invention. RLP frame 400 includes a payload 414 comprising one or more vocoder frames and further includes a header comprising data fields 402–412. A network capacity data field 402 provides an indication of the capacity that the network is operating at. Preferably this data field indicates whether the network is operating at above or below a predefined threshold. A sequence (SEQ) data field 404 contains the least significant bits of the data frames sequence number. The sequence number corresponds to a position, in time, of the RLP frame relative to other RLP frames generated by the MS as part of an audio communication. The sequence number allows a receiving communication device to receive the RLP frames in any order and then to reorder the frames in the order in which the frames were generated. When an RLP frame is retransmitted, the SEQ value of the original RLP frame is maintained. A retransmitted frame data field (REXMIT) 406 is set to '1' when the frame is retransmitted data frame and otherwise is set to '0'. A vocoded frame data field (VS) 408 indicates the number of vocoded frames included in the RLP frame, and a split index data field (SPLT_INDX) 410 indicates whether any vocoded frames had to be split among multiple RLP frames. An audio play-out control data field (AUDIO_CTRL) 412 indicates whether the audio receiver should begin play-out of any received codec samples. This field is set to '1' to indicate play-out should begin and '0' to indicate play-out should not begin and buffering should take place.

Figure 5:
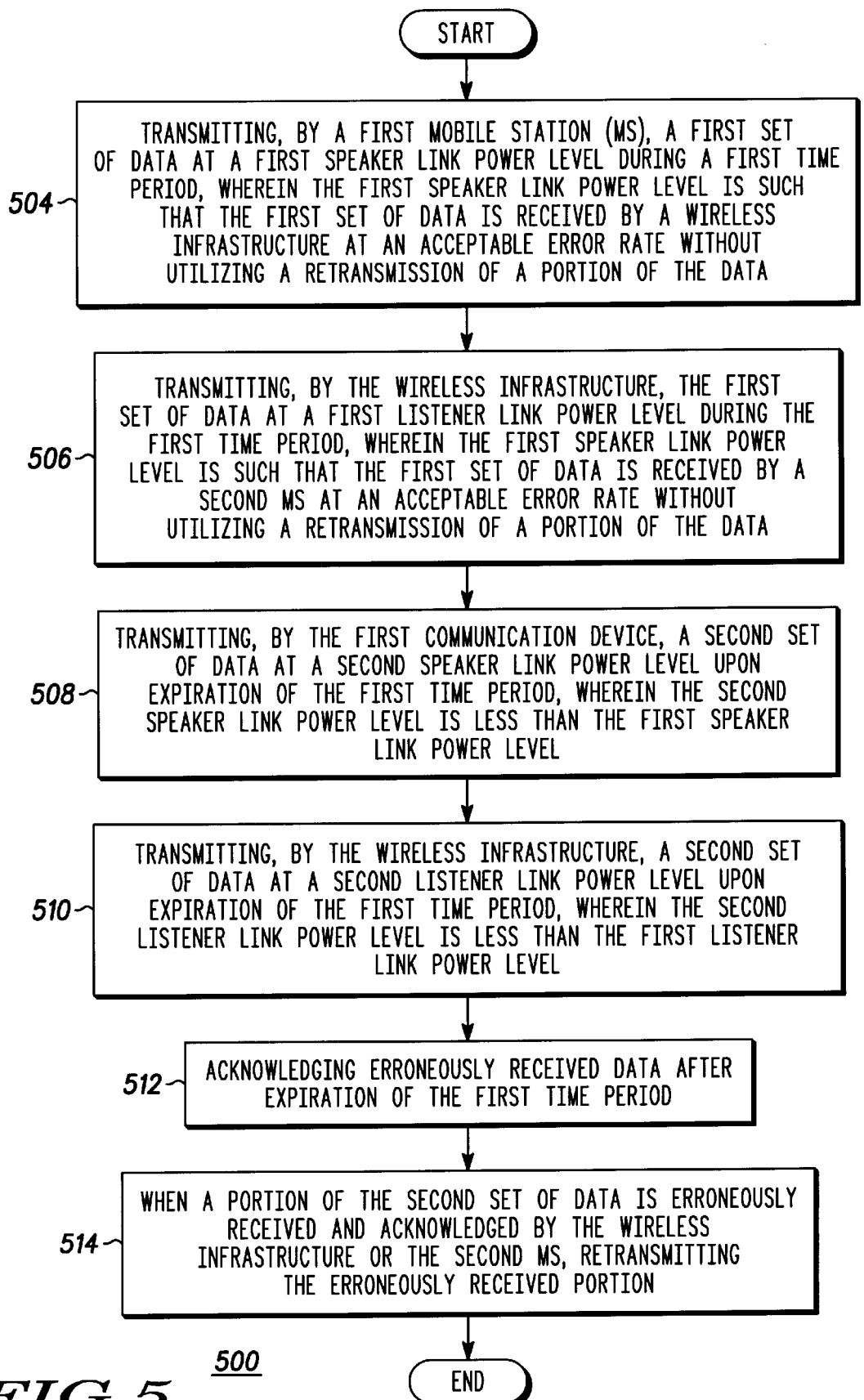
FIG. 5 is a logic flow diagram of the steps executed by a communication system in transmitting data packets in accordance with an embodiment of the present invention.

In order to minimize jitter buffer delay and to maximize utilization of the RF links connecting MS 102 to MS 104, communication system 100 controls and adjusts the power levels at which RLP frames are transmitted over the RF links, that is, the speaker reverse RF link and the listener forward RF link, included in the overall forward link between MS 102 and MS 104 and adjusts the target error rates for each RF link. FIG. 5 is a logic flow diagram 500 of steps executed by system 100 in exchanging data between MS 102 and MS 104 in accordance with an embodiment of the present invention. Logic flow diagram 500 begins when MS 102 begins transmitting RLP frames to infrastructure 124 via the speaker reverse RF link in reverse link 132. MS 102 transmits (504) the frames at a first speaker link power level. The first speaker link power level is based on an initial, low frame error rate (LOW_FER) target for the overall forward link between MS 102 and MS 104. The first speaker link power level is designed to be a high enough power level that the RLP frames received by the target mobile station, that is, MS 104, will achieve the LOW_FER target without the need to employ any retransmissions of RLP frames by either infrastructure 124 or MS 104. MS 102 transmits the frames at the first power level and based on the LOW_FER target for a first period of time, that is, a first buffer build (BUFF_BUILD) period of time, after the speaker begins speaking.

The LOW_FER target is a desired frame error rate (FER) for received RLP frames in the absence of retransmissions of erroneously received frames. This target may vary with the type of data being transmitted. For example, voice communications are more tolerant of errors than data communications and therefore a higher FER may be acceptable for voice communications. By way of another example, and merely for the purpose of illustrating the principles of the present invention, suppose that the minimum tolerable FER for voice communications is 1 percent (%) and that there is a zero (0) percent NAK erasure rate. Without any retransmissions, the LOW_FER target should be set at, at most, 1%. However, if one retransmission is permitted and an FER of 1% is desired, then the FER target may be set at 10%. By setting the FER target at 10%, approximately 10% of the originally transmitted RLP frames are erroneously received and then approximately 10% of the retransmitted RLP frames are erroneously received, for an overall error rate of $10\% \times 10\% = 1\%$ (i.e., $0.10 \times 0.10 = 0.01$). By using retransmissions and targeting a higher FER (i.e., 10%), the RLP frames may be transmitted at a lower power level, thereby minimizing interference with other communications using the same or adjacent bandwidths. However, by using retransmissions, additional system 100 bandwidth is consumed and system capacity and efficiency is reduced.

The BUFF_BUILD time period is approximately the length of time that it takes to fill RLP buffer 324 in an MS receiving RLP frames. Preferably, the size of jitter buffer 324 is approximately the maximum length of time that may expire from a transmission, by a receiving communication device, of an acknowledgment of an erroneously received RLP frame until the receiving communication device receives a correctly retransmitted frame, after a predetermined maximum number of retransmissions, or aborts the frame, which ever shall last occur, plus a little slack to compensate for variations in system 100 performance. An abort simply indicates that system 100 has given up on attempting to transmit that particular frame. An abort is well defined in the IS-707 standard, which standard is promulgated by the TIA/EIA and is hereby incorporated herein. The greater the number of retransmissions permitted of an erroneously received RLP frame, the greater size of the jitter buffer. Assuming that only one retransmission is permitted of an erroneously received RLP frame, a preferred default value for the BUFF_BUILD period of time is 300 ms.

RLP frames received by infrastructure 124 after the speaker RF links are built and prior to the completion of the listener RF links are stored in RLP buffer 210 in the infrastructure. Infrastructure 124, in particular signal processing unit 206, may also perform an error check on each frame to determine whether the frame was correctly received and determine an error metric that measures an error rate for the received signal. For example, the error metric may be an FER or a bit error rate (BER) for each received RLP frame, or may be a signal-to-noise ratio (SNR), a carrier-to-interference ratio (CIR), or an $E_b/I_o$ ratio (energy per bit/interference power density (per Hertz)) determined for the received signal and compared to a respective SNR, CIR, or $E_b/I_o$ threshold.

In one embodiment of the present invention, the frames stored in RLP buffer 210 are not resequenced, leaving the task of resequencing solely up to listener MS 104. In another embodiment of the present invention, signal processing unit 206 determines a buffer depth of RLP buffer 210, that is, the amount of data stored in the buffer. The determined buffer depth is then compared to a buffer depth threshold that is stored in memory unit 214 or a memory associated with signal processing unit 206. When the determined buffer depth is greater than the buffer depth threshold, signal processing unit 206 resequences the frames stored in buffer 210. Otherwise signal processing unit 206 does not resequence the stored frames. By resequencing RLP frames, infrastructure 124 adds a measure of reliability to system 100 and improves the efficiency with which listener MS 104 may determine whether the MS is missing a frame. By resequencing RLP frames only when the determined buffer depth is greater than the buffer threshold, delay is minimized in the conveyance of RLP frames from MS 102 to MS 104 during the BUFF_BUILD time period, particularly when RLP frames are conveyed by infrastructure 124 to MS 104 prior to RLP buffer 210 being completely filled.

During the BUFF_BUILD time period, the first speaker link power level has been set at a sufficiently high rate that data retransmissions are not required for the speaker RF links. As a result, in one embodiment of the present invention, infrastructure 124 transmits the RLP frames stored in buffer 210 to their intended destination, that is, MS 104, as soon as the listener RF links are built. In another embodiment of the present invention, infrastructure 124 determines a buffer depth of RLP buffer 210 before transmitting the stored frames. Infrastructure 124 then transmits the stored frames to MS 104 only after determining that the buffer depth of buffer 210 is at least equal to a buffer depth target for play-out buffer 326 in MS 104. The buffer depth target is approximately the amount of time that expires between a time that MS 104 first transmits an acknowledgment of an erroneously received frame and a time that the MS either correctly receives a retransmitted frame, after a predetermined maximum number of retransmissions, or aborts the frame, which ever shall last occur, plus a little slack to compensate for variations in system 100 performance.

During the BUFF_BUILD time period, infrastructure 124 transmits (506) RLP frames to MS 104 at a first listener link power level on the listener forward RF link. Similar to the first speaker link power level, the first listener link power level is also based on the low frame error rate (LOW_FER) target and is a high enough power level that the LOW_FER target may be achieved at MS 104 without the need for employing retransmissions of data. Preferably, the LOW_FER target is preprogrammed into system 100, in particular into infrastructure 124. When the speaker RF links are built, RAN 106 informs MS 102 of the power level required for the initial transmission of RLP frames, that is, the first speaker link power level. This power level is preferably communicated through an exchange of preambles between MS 102 and RAN 106 as is well known in the art. Alternatively, during the CDMA signaling in the setting up of the speaker RF links, RAN 106 signals MS 102 to increase or decrease the transmitted power level until the LOW_FER target is achieved, as determined by the infrastructure. When MS 104 and RAN 118 build the listener RF links, RAN 118 sends MS 104 a CDMA signaling message that informs the MS of the LOW_FER target sought to be achieved. Alternatively, the LOW_FER target and/or the first listener link power level may be preprogrammed into MS 102 and/or MS 104. Then, as part of the CDMA signaling during the building of the listener RF links, MS 104 signals RAN 118 to increase or decrease the transmitted power level until the LOW_FER target is achieved, as determined by the MS.

When MS 104 begins receiving RLP frames from infrastructure 124, the MS routes each frame to signal processing unit 306 included in the MS. In turn, signal processing unit 306 routes the frame to codec 320, which decodes the frame and routes the decoded frame to RLP jitter buffer 324. Signal processing unit 306 also performs an error check on each RLP frame, determining whether the frame was correctly received and determining an error metric, such as an FER, a BER, an SNR, a CIR, or an $E_b/I_o$ ratio, for forward link 134. MS 104 may then convey the error information to infrastructure 124. During the BUFF_BUILD time period, incorrectly received RLP frames are erased, or dropped, by each of MS 104 and infrastructure 124 and there are no retransmissions of the erased or dropped frames.

MS 104 stores correctly received RLP frames in RLP jitter buffer 324, where the frames are reordered based on the sequencing (SEQ) number included in the RLP header of each frame. Signal processing unit 306 of MS 104 extracts the transmitted vocoded frames, in the order that they were transmitted, from the reordered RLP frames stored in RLP jitter buffer 324 and stores the vocoded frames in play-out buffer 326. When MS 104 is authorized to begin playing out the vocoded frames, signal processing unit 306 routes the vocoded frames to vocoder 328, where the vocoded frames are decompressed and played out to the user of MS 104 via D/A 310 and user interface 312.

In one embodiment of present invention, MS 104 is authorized, either by system design or by infrastructure 124, to play out the audio information included in the received RLP frames as soon as the frames are received by the MS. In another embodiment of the present invention, wherein infrastructure 124 sends RLP frames to MS 104 before the depth of RLP buffer 210 attains a depth equal to the target depth of play-out buffer 326, the infrastructure may instruct MS 104 to wait an amount of time equal to the difference between the depth of buffer 210 and the target depth of buffer 326 before playing out the audio information included in the received RLP frames. In the latter embodiment, infrastructure 124 causes MS 104 to delay playing out voice until the infrastructure has received, and transmitted to MS 104, sufficient data to fill play-out buffer 326 in the MS.

Preferably, infrastructure 124 instructs, or authorizes, MS 102 to begin playing out audio information via the AUDIO_CNTRL data field of the RLP frames. In one embodiment of the present invention, during the BUFF_BUILD time period MS 102 sets the AUDIO_CTRL data field of each data frame to a value of '0.' When infrastructure 124 receives RLP frames from MS 102, and MS 104 in turn receives RLP frames from infrastructure 124, each of infrastructure 124 and MS 104 checks each received RLP frame for the value stored in the AUDIO_CTRL data field. So long as the value stored in the AUDIO_CTRL data field of their respectively received RLP frames is '0,' infrastructure 124 and MS 104 each processes their respectively received RLP frames without acknowledging the erroneously received frames.

When MS 104 detects a '1' in the AUDIO_CTRL data field of a received RLP frame, the MS interprets this as authorization to play out received audio information. Therefore, when infrastructure 124 wishes to instruct, or authorize, MS 104 to begin playing out audio information, the infrastructure inserts a value of '1' into the AUDIO_CTRL data field of an RLP frame. When infrastructure 124 wishes to instruct, or authorize, MS 104 to begin playing out audio information as soon as the listener RF links are built, the infrastructure inserts a '1' into the AUDIO_CTRL data field of all RLP frames sent to the MS. Alternatively, when the depth of RLP buffer 210 is less than the target depth of play-out buffer 326 at the time that infrastructure 124 begins transmitting RLP frames to MS 104, and the infrastructure wishes to instruct MS 104 to wait an amount of time equal to the buffer depth difference before playing out audio information, then the infrastructure inserts a '0' into an AUDIO_CTRL data field of each transmitted RLP frame until an amount of time equal to the buffer depth difference expires after the transmission of the initial RLP frame to MS 104. Upon expiration of the amount of time equal to the buffer depth difference, infrastructure 124 then begins inserting '1's into the AUDIO_CTRL data field of RLP frames transmitted to MS 104.

When MS 104 first detects a received RLP frame with the AUDIO_CTRL data field set to '1,' a dispatch application executed by signal processing unit 306 of MS 104 is signaled to begin playing out the vocoded frames stored in play-out buffer 326. After the expiration of the BUFF_BUILD time period, MS 102 inserts a value of '1' in the AUDIO_CTRL data field of all subsequently transmitted RLP frames until the speaker button release (end of talk spurt) is detected. In one embodiment of the present invention, expiration of the BUFF_BUILD time period is determined by MS 102 by reference to a timer 314 coupled to signal processing unit 306 of the MS. Infrastructure 124 then determines the expiration of the BUFF_BUILD time period by detecting a '1' in the AUDIO_CTRL data field of received RLP frames. Upon determining the expiration of the BUFF_BUILD time, infrastructure 124 also inserts a value of '1' in the AUDIO_CTRL data field of all subsequently transmitted RLP frames. MS 104 then determines the expiration of the BUFF_BUILD time period by detecting a '1' in the AUDIO_CTRL data field of received RLP frames.

In another embodiment of the present invention, expiration of the BUFF_BUILD time period is determined by each of MS 102, infrastructure 124, and MS 104 by reference to timers 216, 314 respectively coupled to their signal processing units 206, 306. In yet another embodiment of the present invention, the expiration of the BUFF_BUILD time period is dynamically determined by infrastructure 124 based on the time at which the infrastructure determines that one or more of RLP buffer 210, jitter buffer 324, and play-out buffer 326 is full. Infrastructure 124 is able to approximately determine when buffers 324 or 326 are full based on known buffer sizes, a known FER, the number of frames transmitted by the infrastructure to the buffers, and a known play-out rate of the MS. Infrastructure 124 may then convey information concerning the expiration of the BUFF_BUILD period to each of MS 102 and MS 104.

Upon determining that the BUFF_BUILD time period has expired, each of infrastructure 124 and MS 104 begins acknowledging (512) erroneously received RLP frames by transmitting an acknowledgment (i.e., a NAK). Infrastructure 124 sends a NAK for each erroneously received frame to MS 102 via forward link 130, and MS 104 sends a NAK for each erroneously received frame to infrastructure 124 via reverse link 136. Based on the received NAK's, infrastructure 124 is able to determine a frame error rate (FER) for reverse link 136, and MS 102 is able to determine a frame error rate (FER) for forward link 130. Alternatively, infrastructure 124 and MS 102 may also determine error metrics such as a BER, SNR, CIR, or $E_b/I_o$ ratio based on the received NAK's. MS 102 may then convey the FER, BER, SNR, CIR, and/or $E_b/I_o$ ratio results to infrastructure 124.

After the expiration of the BUFF_BUILD time period, when infrastructure 124 correctly receives RLP frames from MS 102, the infrastructure forwards the frames to their intended destination, that is, MS 104. However, when infrastructure 124 receives an erroneous RLP frame from MS 102, the infrastructure transmits a NAK to MS 102 that identifies the erroneous frame and stores RLP frames subsequently received from MS 102 in RLP buffer 210. Included in the NAK is an identifier of the erroneously received frame. Similarly, when MS 104 receives an erroneous RLP frame from infrastructure 124 after the expiration of the BUFF_BUILD time period, MS 104 transmits a NAK to the infrastructure that identifies the erroneous frame and stores RLP frames subsequently received from the infrastructure in jitter buffer 324. NAK's are well known in the art and will not be described in greater detail herein.

When MS 102 or infrastructure 124 receives a NAK, MS 102 or infrastructure 124 retransmits (514) the RLP frame identified in the NAK, setting the retransmitted frame data field (REXMIT) of the retransmitted frame to '1.' When infrastructure 124 or MS 104 correctly receives the retransmitted RLP frame, the correctly received frame is inserted into the frame's sequential position among the RLP frames that have been buffered in the respective RLP buffer 210, 324. After adding the correctly retransmitted frame to the frames stored in buffers 210 or 324, infrastructure 124 or MS 104 respectively convey their buffered frames to MS 104 or the listener using MS 104. When either infrastructure 124 or MS 104 erroneously receives a retransmitted frame a predetermined number of times, preferably once, then the infrastructure or the MS aborts the frame and transmits the frames stored in respective buffers 210 and 324 without the inclusion of the erroneous frame. Those who are of ordinary skill in the art realize that the number of times that a frame is retransmitted before being aborted is up to the designer of the system and that other numbers of retransmissions may be used herein without departing form the spirit and scope of the present invention.

In addition, upon expiration of the BUFF_BUILD time period, each of infrastructure 124 and MS 104 switches to a higher frame error rate (HIGH_FER) target for the processing of RLP frames, and each of and MS 102 and infrastructure 124 switches to a correspondingly lower transmitted power level. That is, after the acknowledgments begin, each of infrastructure 124 and MS 104 can tolerate a greater percentage of errors per data transmission since erroneously received RLP frames are being acknowledged and retransmitted. As a result, when infrastructure 124 begins acknowledging erroneously received frames, MS 102 begins transmitting (508) RLP frames at a second speaker link power level that is less than the first speaker link power level. Similarly, when MS 104 begins acknowledging erroneously received frames, infrastructure 124 begins transmitting (510) RLP frames at a second listener link power level that is less than the first speaker link power level By transmitting RLP frames at higher power levels that minimize the need to acknowledge erroneously received frames, and seeing a LOW_FER target appropriate for communications that do not include acknowledgments, communication system 100 minimizes the use of the jitter buffer 324 during the BUFF_BUILD period. By minimizing the use of jitter buffer 324, communication system 100 is able to play out audio information to a listener using MS 104 sooner than is possible in the prior art. Furthermore, communication system 100 allows the speaker using MS 102 to begin speaking even before the listener RF links are built, storing the transmitted RLP frames in buffer 210 in infrastructure 124 until the listener RF links are built. Upon completion of the listener RF links, the RLP frames stored in buffer 210 may be immediately downloaded to MS 104 and immediately played out by the MS. Alternatively, infrastructure 124 may instruct MS 104 to delay playing out voice until the infrastructure has received, and transmitted to MS 104, sufficient data to fill play-out buffer 326 in the MS.

Due to voice compression by vocoder 328 in MS 102 and voice decompression by vocoder 328 in MS 104, audio information is received by MS 104 more quickly than the MS can play it out. As a result, during the BUFF_BUILD period, communication system 100 fills jitter buffer 324 in MS 104 while the MS is playing out audio information. After jitter buffer 326 is filled, the BUFF_BUILD period ends. At this time, jitter buffer 324 in MS 104 is filled and acknowledgments and retransmissions are instituted in communication system 100. Since the jitter buffer is filled, an acknowledgment and a retransmission of an RLP frame erroneously received by infrastructure 124 or MS 104 will not create a gap in the play out of audio information. Furthermore, since acknowledgments and a retransmissions are being used, a higher FER target is established for the overall link between MS 102 and MS 104 and RLP frames are transmitted at lower power levels. By transmitting RLP frames at lower power levels, RF interference with other communications sharing the same bandwidth or adjacent bandwidths is minimized.

The process described above for expediting the play out of audio information to a listener in a dispatch communication is also applicable to a change in who is speaking in a dispatch communication. Similar to the initiation of a dispatch communication, a listener using a mobile station involved in a dispatch communication, such as a user of MS 104, who wishes to speak may reserve traffic channels in a reverse link and a forward link, such as reverse link 136 and forward link 134, by depressing the PTT key on the user's MS. Speaker RF links are then established for use by the user in each of reverse link 136 and forward link 134, and listener RF links are established for the listener, that is MS 102, in forward link 130 and reverse link 132. Alternatively, MS 102 and MS 104 may each be able to maintain their already established RF links. The above described process may then be used to expedite the play out of audio information from the user of MS 104 to the user of MS 102 and to any other participants in the dispatch call, whose jitter buffers are preferably all reset.

Figure 6A:
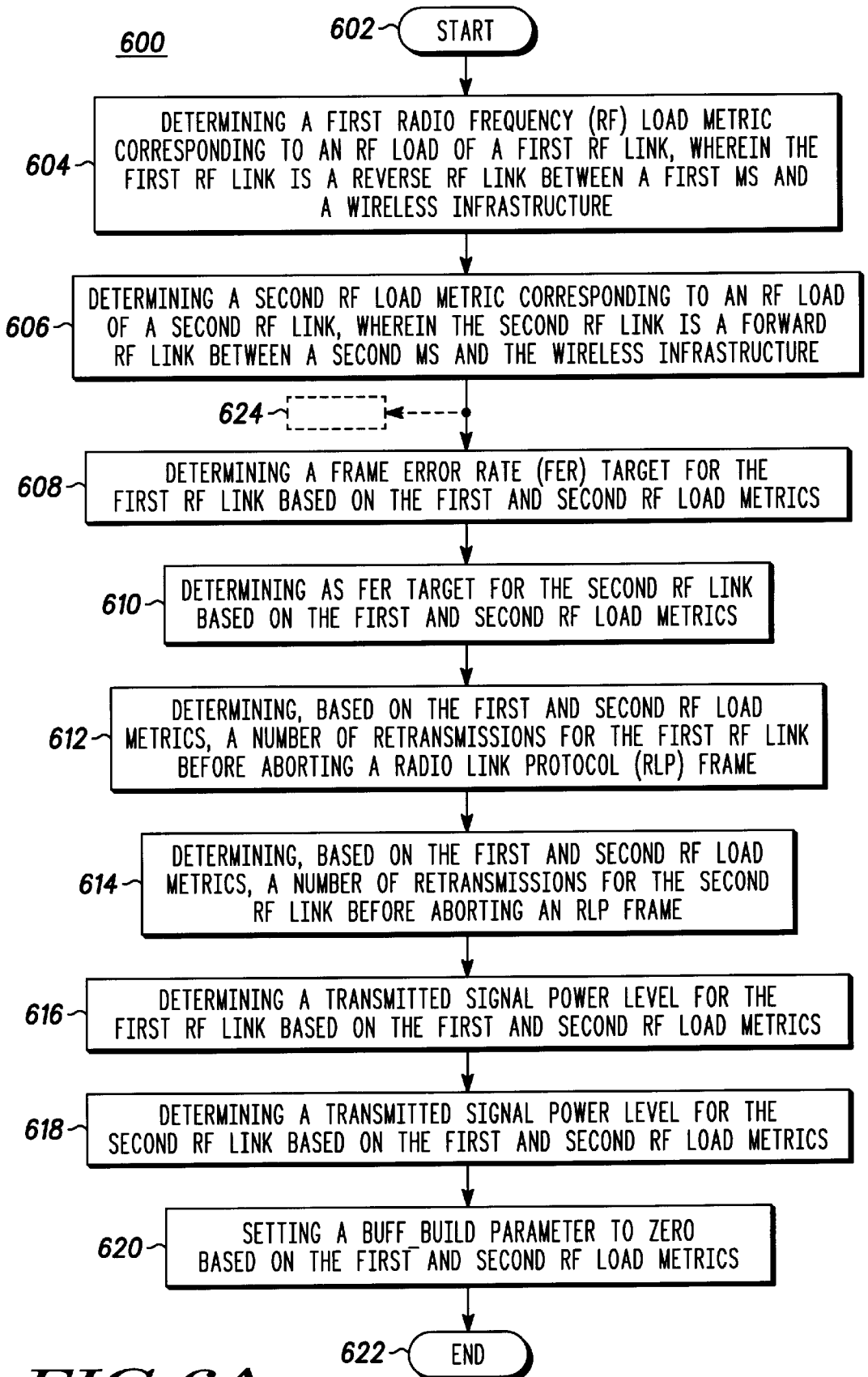
FIG. 6A is a logic flow diagram of the steps executed by a communication system in transmitting data packets in accordance with another embodiment of the present invention.
Figure 6B:
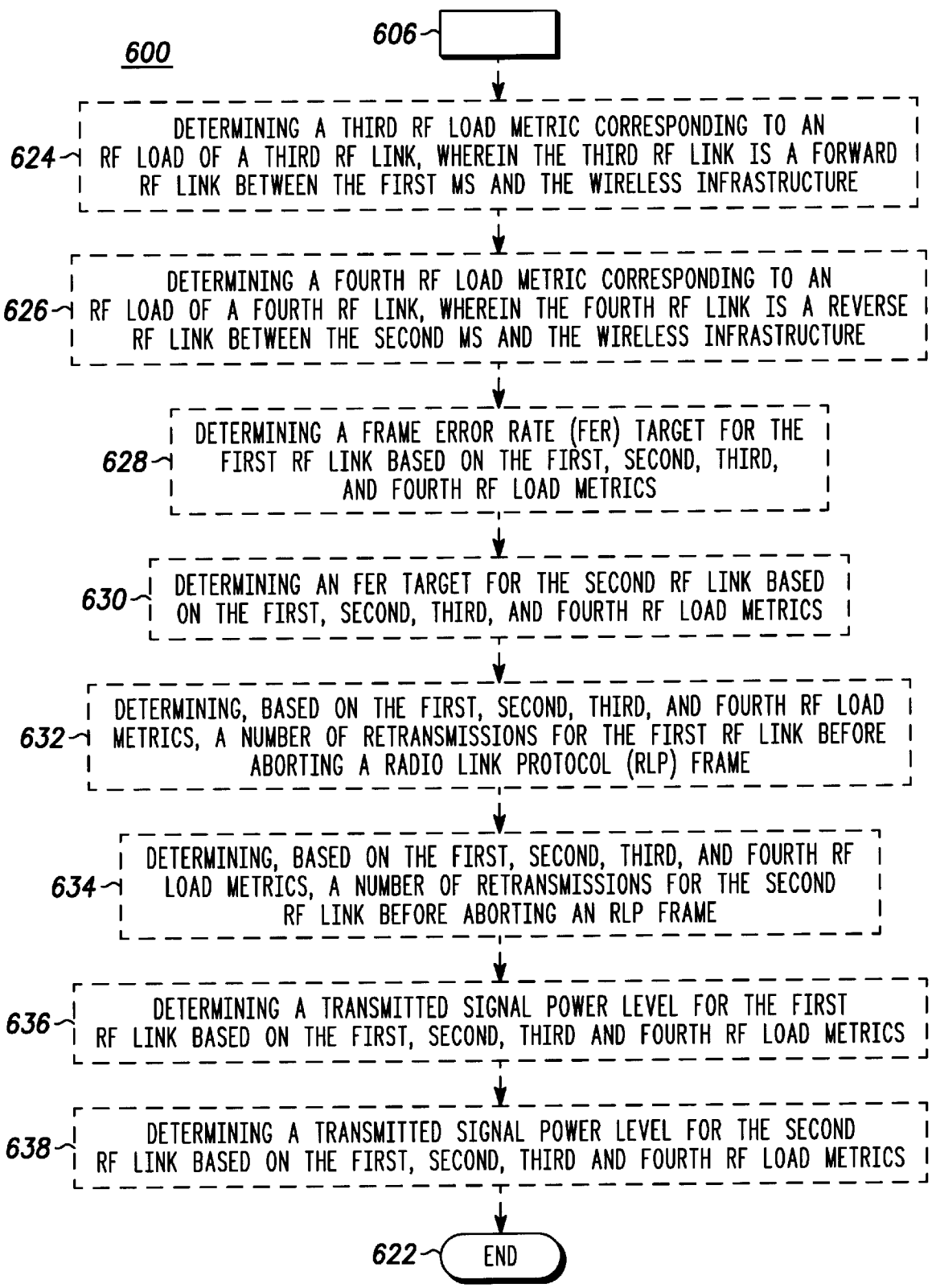
FIG. 6B is a continuation of the logic flow diagram of FIG. 6A of the steps executed by a communication system in transmitting data packets in accordance with another embodiment of the present invention.

In another embodiment of the present invention, MS 102 and infrastructure 124 may adjust one or more of frame error rate (FER) targets and transmitted signal power levels for their respective legs of the forward link between MS 102 and MS 104 at any time during a dispatch communication. FIGS. 6A and 6B are a logic flow diagram 600 of steps executed by system 100 in adjusting FER targets and transmitted power levels of a packet data communication in accordance with another embodiment of the present invention. Logic flow 600 begins (602) when infrastructure 124 determines (604) a first radio frequency (RF) load metric corresponding to an RF load of reverse link 132, which reverse link includes the speaker reverse RF link. For example, the determined RF load metric may be a measure of the reverse link RF capacity presently in use, such as a percentage of all existing traffic channels in reverse link 132 that are currently assigned to active communications, or a percentage of all existing traffic channels in reverse link 132 that are unassigned and available for assignment. Infrastructure 124 also determines (606) a second RF load metric corresponding to an RF load of forward link 134, which forward link includes the listener forward RF link.

Based on the first and second RF load metrics, infrastructure 124 then determines (608) an FER target for the speaker reverse RF link and further determines (610) an FER target for the listener forward RF link. The FER targets are the FER's that communications on each link are desired to attain. As described in detail above, the setting of an FER target is dependent upon the number of retransmissions permitted of an erroneously received frame. The infrastructure may also determine (612) a number of retransmissions for the speaker RF links before aborting a frame transmitted over the speaker reverse RF link and may determine (614) a number of retransmissions for the listener RF links that may be attempted before aborting a frame in the listener forward RF link.

Also, as is apparent to one of ordinary skill in the art, the attained FER is related the to the power level used to transmit the RLP frames, as greater numbers of retransmissions and higher transmitted power levels each corresponds to lower FER's. As a result, based on the determined FER targets, infrastructure 124 may also do one or more of determine (616) a transmitted signal power level for the speaker reverse RF link, determine (618) a transmitted signal power level for the listener forward RF link, and set (620) the BUFF_BUILD parameter to zero, and the logic flow ends (622).

For example, and merely for the purpose of illustrating the principles of the present invention, infrastructure 124 may determine that the RF load of reverse link 132 is greater than the RF load of forward link 134. Since forward link 134 is less crowded, infrastructure 124 may determine that forward link 134 can support more retransmissions of erased frames, a higher transmitted signal power level, or both, than reverse link 132. As a result, infrastructure 124 may decide to use more layers of acknowledgments (e.g., NAK's) on the speaker RF links, such as twice acknowledging erroneously received RLP frames instead of once. Alternatively, infrastructure 124 may determine that the speaker RF links should use fewer layers of acknowledgments or a lower transmitted signal power so as to free up RF capacity in reverse link 134 and/or reduce the levels of interference on the reverse link.

Furthermore, since the overall forward link FER for a signal transmitted from MS 102 to MS 104 is a combination of the FER's for signals transmitted over the leg from MS 102 to infrastructure 124 and over the leg from infrastructure 124 to MS 104, the infrastructure may decide to make concurrent adjustments to transmissions over the speaker reverse RF link and the listener forward RF link in order to maintain an overall forward link (i.e., from MS 102 to MS 104) FER target. For example, infrastructure 124 may adopt a lower FER target for the listener forward RF link and a higher FER target for the speaker reverse RF link while maintaining an overall forward link FER target. Alternatively, or in addition to adjusting FER targets, infrastructure 124 may decide to increase the transmitted power level for the listener forward RF link and reduce the transmitted power level for the speaker reverse RF link in order to maintain an overall forward link FER target.

In still another embodiment of the present invention, infrastructure 124 may further determine (624) a third RF load metric corresponding to an RF load of forward link 130 and determine (626) a fourth RF load metric corresponding to an RF load of the reverse link 136. Infrastructure 124 may then determine (628, 630) an FER target for each of the speaker reverse RF link and the listener forward RF link based on each of the first, second, third, and fourth RF load metrics. Furthermore, based on the first, second, third, and fourth RF load metrics, infrastructure 124 may also determine (632, 634) a maximum number of retransmissions for each of the speaker RF links and the listener RF links and/or may further determine (636, 638) transmitted signal power levels for each of the speaker RF link 132 and the listener forward RF link.

Figure 7A:
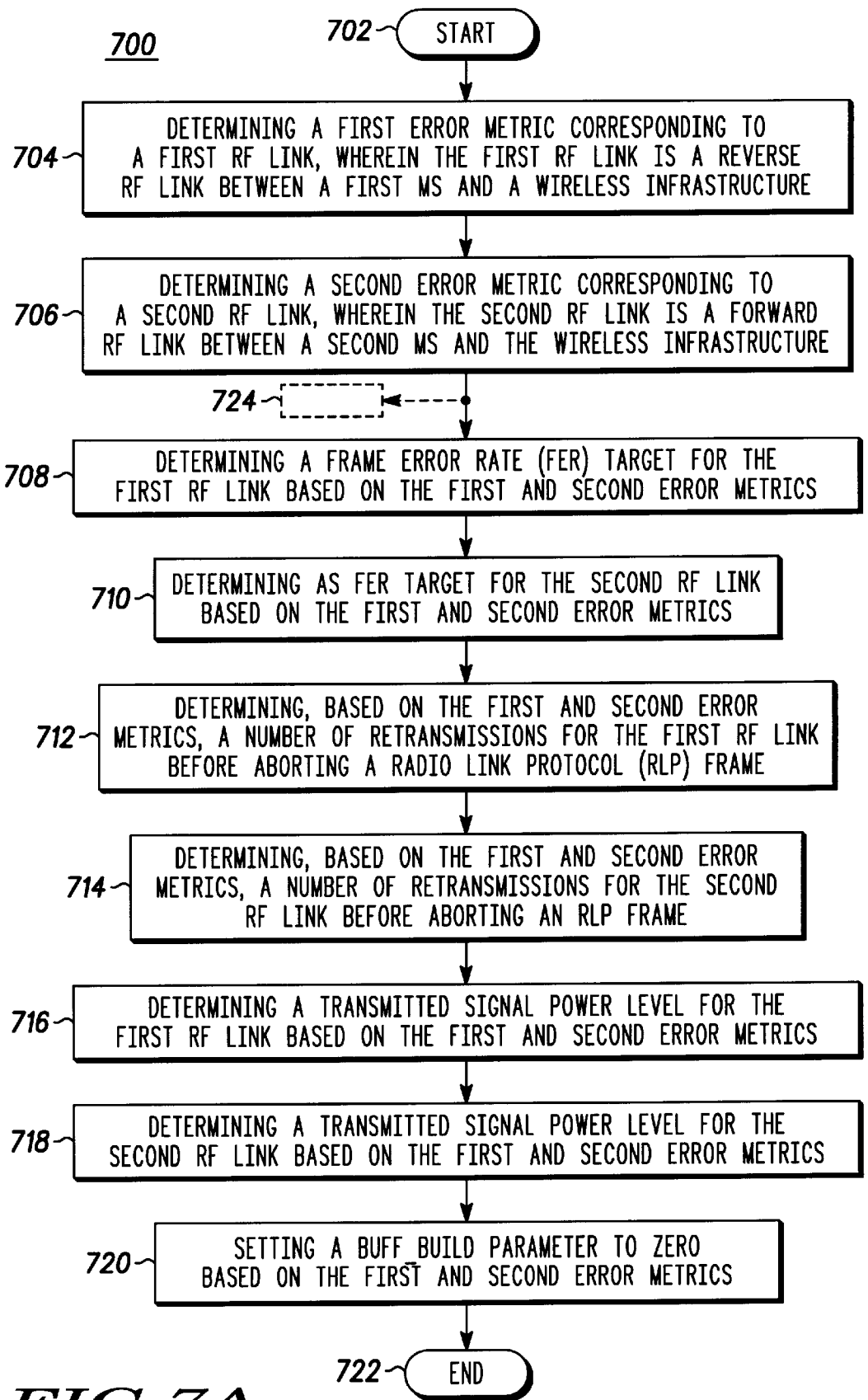
FIG. 7A is a logic flow diagram of the steps executed by a communication system in transmitting data packets in accordance with another embodiment of the present invention.

In yet another embodiment of the present invention, instead of adjusting the FER targets and/or transmitted signal power levels for one or more legs of the link between MS 102 and MS 104 based on determined RF loads, the adjustments may be based on error metrics determined for each leg. FIGS. 7A and 7B are a logic flow diagram 700 of the transmission of data by system 100 in accordance with another embodiment of the present invention. Logic flow diagram 700 begins (702) when infrastructure 124 determines (704) a first error metric corresponding to the speaker reverse RF link. Preferably the error metric is an FER or an abort rate; however, those who are of ordinary skill in the art realize that there are many ways to determine an error metric for an RF link. The error metric may be based on bit error rates or may be based on a comparison of a signal power-to-interference ratio to a predetermined threshold. An abort rate corresponds to a percentage of frames that are aborted.

Infrastructure 124 also determines (706) a second error metric corresponding to the listener forward RF link. Based on the first and second error metrics, infrastructure 124 then determines (708) an FER target for the speaker reverse RF link and further determines (710) an FER target for the listener forward RF link. The infrastructure may also determine (712) a number of retransmissions for the speaker RF links before aborting a frame transmitted over the speaker RF links, and may determine (714) a number of retransmissions for the listener RF links that may be attempted before aborting a frame transmitted over the listener RF links. Based on the first and second error metrics, infrastructure 124 may also do one or more of determine (716) a transmitted signal power level for the speaker reverse RF link, determine (718) a transmitted signal power level for the listener forward RF link, and set (720) the BUFF_BUILD parameter to zero, and the logic flow ends (722).

In another embodiment of the present invention, infrastructure 124 may further determine (724) a third error metric corresponding to the speaker forward RF link and determine (726) a fourth error metric corresponding to the listener reverse RF link. The third error metric may be based on NAK's received by MS 102 from infrastructure 124 and the fourth error metric may be based on NAK's received by infrastructure 124 from MS 104. Based on each of the first, second, third, and fourth error metrics, infrastructure 124 then determines (728, 730) an FER target for any one or more of the speaker reverse RF link and the listener forward RF link. Furthermore, based on the first, second, third, and fourth error metrics, infrastructure 124 may also determine (732, 734) a number of retransmissions for each of the speaker reverse RF link and the listener forward RF link before a frame is aborted and/or determine (736, 738) a transmitted signal power level for each of the speaker reverse RF link and the listener forward RF link.

In still another embodiment of the present invention, infrastructure 124 may determine (740) an overall error target, such as an overall FER target, or an overall abort rate, for transmissions from MS 102 and MS 104 based on the first and second, or additionally the third and fourth, error metrics. Infrastructure 124 then compares (742) the overall error target or abort rate to an error target or abort rate threshold and adjusts (744) an FER target or transmitted signal power level for one or more of the speaker RF links and the listener RF links based on the comparison. In this way infrastructure 124 can maintain an overall error rate or abort rate for the link between MS 102 and MS 104 while individually adjusting the performance of each leg of the link. By individually adjusting each leg of the link, retransmissions may be utilized on the legs that can best afford retransmissions and transmissions may be made at higher power levels on the legs where the transmissions will least interfere with other communications.

For example, and again merely for the purpose of illustrating the principles of the present invention, infrastructure 124 may utilize the following formula in making adjustments to the error rates of one or more links 130–136. First, infrastructure 124 estimates 'Pr(AB)' wherein Pr(AB)= Abort Probability across reverse link 132 and forward link 134. The Abort Probability may be estimated by directly measuring it or by estimating it as follows:

$$Pr(AB)=S\_ABORT+(1-S\_ABORT)*R\_ABORT;$$

wherein $$S\_ABORT=SF*(SN+(1-SN)*SF)^{SRNDs},$$

$$R\_ABORT=RF*(RN+(1-RN)*RF)^{RRNDs},$$

and SF=Sender's (i.e., MS 102) Frame Erasure Rate (for reverse link 132), SN=Sender's NAK Erasure Rate (for forward link 130), SRNDS=Sender's number of NAKs Prior to Aborting (summing over all rounds), RF=Receiver's (i.e., MS 104) Frame Erasure Rate (for reverse link 136), RN=Receiver's NAK Erasure Rate (for forward link 134), and RRNDS=Receiver's number of NAKs Prior to Aborting (summing over all rounds). Infrastructure 124 also determines the RF load for each of links 130–136.

Infrastructure 124 then compares 'Pr(AB)' to a target level for the abort probability, that is, AB_Target. When Pr(AB) is greater than ('>') AB_Target, then infrastructure 124 increases the FER on the link 130–136 with the least remaining RF capacity. When Pr(AB) is less than ('<') AB_Target, then infrastructure 124 decreases the FER on the link 130–136 with the most remaining RF capacity. By adjusting the FER's based on the above formulas, infrastructure 124 is able to reduces the total forward link RF impact of a call while maintaining the same effective RLP frame abort rate across the entire call.

In sum, wireless packet data communication system 100 transmits data from a first mobile station (i.e., MS 102) to infrastructure 124 at a first speaker link power level, and from the infrastructure 124 to a second mobile station (i.e., MS 104) at a first listener link power level, during a first time period, that is, the BUFF_BUILD time period. Preferably, the first time period is approximately the length of a jitter buffer. Each of the first speaker link power level and the first listener link power level is designed to avoid the need for retransmissions of erroneously received data. By eliminating the need for retransmissions, the play-out buffer 326 in MS 104 may filled sooner and voice communications may be relayed from the speaker to the listener more quickly. Upon expiration of the first time period, data is transmitted from MS 102 to infrastructure 124 and from the infrastructure to MS 104 at reduced power levels, which transmissions include retransmissions of erroneously received data. By subsequently operating at reduced power levels, RF interference with other on-going communications may be minimized.

Frame error rate (FER) targets used in the transmission of data may also be adjusted after expiration of the first time period. In addition, the power levels and FER's may be individually adjusted on a link-by-link basis based on the RF loading of each link and/or based on error metrics determined for each link. In this way, interference for on-going communications in each link is minimized while overall, with respect to the conveyance of data from MS 102 to MS 104, error targets are maintained.

While the present invention has been particularly shown and described with reference to particular embodiments thereof, it will be understood by those skilled in the art that various changes may be made and equivalents substituted for elements thereof without departing from the spirit and scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. A method for transmitting data comprising steps of:

transmitting, by a first communication device, a first set of data at a first speaker link power level during a first time period, wherein the first power level is such that the first set of data is received by a second communication device that is included in a wireless infrastructure at an acceptable error rate without utilizing a retransmission of a portion of the first set of data;

transmitting, by the first communication device, a second set of data at a second speaker link power level upon expiration of the first time period, wherein the second power level is less than the first power level;

when a portion of the second set of data is erroneously received by the second communication device, retransmitting the erroneously received portion;

transmitting, by the wireless infrastructure, the first set of data at a first listener link power level upon expiration of the first time period, wherein the first listener link power level is such that the first set of data is received by a third communication device at an acceptable error rate without utilizing a retransmission of a portion of the first set of data;

transmitting, by the wireless infrastructure, the second set of data at a second listener link power level upon expiration of the first time period, wherein the second listener link power level is less than the first listener link power level; and when a portion of the second set of data is erroneously received by the third communication device, retransmitting, by the wireless infrastructure, the erroneously received portion.

2. The method of claim 1, wherein the second communication device includes a jitter buffer and wherein the first time period is approximately the same size as the jitter buffer.

3. The method of claim 1, wherein the first time period comprises the time that expires between a completing of a set up of a traffic link between the first communication device and the infrastructure and a completing of a set up of a traffic link between the infrastructure and the third communication device, and further comprising a step of playing out, by the third communication device, at least a portion of the first set of data upon receiving the at least a portion of the first set of data.

4. The method of claim 1, wherein the third communication device includes a play-out buffer, wherein the first time period comprises a time period that is approximately equal to a buffer depth target for the play-out buffer, and further comprising a step of playing out, by the third communication device, at least a portion of the first set of data upon receiving the at least a portion of the first set of data.

5. The method of claim 4, wherein a length of the first time period is preprogrammed into each of the first communication device, the infrastructure, and the third communication device.

6. The method of claim 4, further comprising steps of:

determining, by the infrastructure, a length of the first time period; and conveying, by the infrastructure, the determined length of the first time period to each of the first communication device and the third communication device.

7. The method of claim 1, further comprising steps of:

determining, by the infrastructure, a length of the first time period; and conveying, by the infrastructure to the third communication device, information concerning an expiration of the first time period via a data field in a radio link protocol (RLP) header.

8. A method for transmitting data comprising steps of:

transmitting, by a first communication device, a first set of data at a first speaker link power level during a first time period, wherein the first power level is such that the first set of data is received by a second communication device that is included in a wireless infrastructure at an acceptable error rate without utilizing a retransmission of a portion of the first set of data;

transmitting, by the first communication device, a second set of data at a second speaker link power level upon expiration of the first time period, wherein the second power level is less than the first power level;

when a portion of the second set of data is erroneously received by the second communication device, retransmitting the erroneously received portion;

transmitting, by the wireless infrastructure, the first set of data at a first listener link power level upon expiration of the first time period, wherein the first listener link power level is such that the first set of data is received by a third communication device at an acceptable error rate without utilizing a retransmission of a portion of the first set of data;

transmitting, by the wireless infrastructure, the second set of data at a second listener link power level upon expiration of the first time period, wherein the second listener link power level is less than the first listener link power level; and when a portion of the second set of data is erroneously received by the third communication device, retransmitting, by the wireless infrastructure, the erroneously received portion.

9. The method of claim 8, wherein the third communication device includes a play-out buffer, wherein the first time period comprises a time period that is approximately equal to a buffer depth target for the play-out buffer, and further comprising a step of playing out, by the third communication device, at least a portion of the first set of data upon expiration of the first time period.

10. A wireless communication system comprising:

a base station that is included in a wireless infrastructure; and a first mobile station in wireless communication with the base station that transmits a first set of data at a first speaker link power level during a first time period, wherein the first power level is such that the first set of data is received by the base station at an acceptable error rate without utilizing a retransmission of a portion of the first set of data, transmits a second set of data at a second speaker link power level upon expiration of the first time period, wherein the second power level is less than the first power level, and upon determining that a portion of the second set of data is erroneously received by the base station, retransmits the erroneously received portion; and wherein the infrastructure transmits the first set of data at a first listener link power level upon expiration of the period, wherein the first listener link power level is such that the first set of data is received by a second mobile station at an acceptable error rate without utilizing a retransmission of a portion of the first set of data wherein the infrastructure transmits the second set of data at a second listener link power level upon expiration of the first time period, wherein the second listener link power level is less than the first listener link power level, and when a portion of the second set of data is erroneously received by the second mobile station, the wireless infrastructure retransmits the erroneously received portion.

11. The system of claim 10, wherein the first time period comprises the time that expires between completing a set up of a traffic link between the first mobile station and the infrastructure and the completing a set up of a traffic link between the infrastructure and the second mobile station, and wherein the second mobile station plays out at least a portion of the first set of data upon receiving the at least a portion of the first set of data.

12. The system of claim 10, wherein the second mobile station comprises a play-out buffer, wherein the first time period comprises a time period that is approximately equal to a buffer depth target for the play-out buffer, and wherein the second mobile station plays out at least a portion of the first set of data upon receiving the at least a portion of the first set of data.

13. The system of claim 10, wherein the infrastructure determines a length of the first time period and conveys the determined length of the first time period to each of the first and second mobile stations.

14. The system of claim 10, wherein the length of the first time period is preprogrammed into each of the infrastructure, the first mobile station, and the second mobile station.

15. The system of claim 10, wherein the infrastructure determines a length of the first time period and conveys information concerning an expiration of the first time period to the second mobile station through a data field in a radio link protocol (RLP) header.

16. A wireless communication system comprising;
a base station that is included in a wireless infrastructure; and
a first mobile station in wireless communication with the base station that transmits a first set of data at a first speaker link power level during a first time period, wherein the first power level is such that the first set of data is received by the base station at an acceptable error rate without utilizing a retransmission of a portion of the first set of data transmits a second set of data at a second speaker link power level upon expiration of the first time period, wherein the second power level is less than the first power level, and upon determining that a portion of the second set of data is erroneously received by the base station, retransmits the erroneously received portion; and
wherein the infrastructure transmits the first set of data at a first listener link power level upon expiration of the first time period, wherein the first listener link power level is such that the first set of data is received by a second mobile station at an acceptable error rate without utilizing a retransmission of a portion of the first set of data, wherein the infrastructure transmits the second set of data at a second listener link power level during the first time period, wherein the second listener link power level is less than the first listener link power level, and when a portion of the second set of data is erroneously received by the second mobile station, the infrastructure retransmits the erroneously received portion.

17. The system of claim 16, wherein the second mobile station includes a play-out buffer, wherein the first time period comprises a time period that is approximately equal to a buffer depth target for the play-out buffer, and wherein the second mobile station plays out at least a portion of the first set of data upon expiration of the first time period.

* * * * *